June 4, 1946.    T. R. SMITH    2,401,378
HYDRAULIC TRANSFER TUBE FOR STRUT MECHANISM Filed March 13, 1943

INVENTOR.
Thomas R. Smith
BY Parkinson & Lane
Attys

Witness:

Patented June 4, 1946

2,401,378

UNITED STATES PATENT OFFICE 2,401,378

HYDRAULIC TRANSFER TUBE FOR STRUT MECHANISM

Thomas R. Smith, Newton, Iowa, assignor to The Maytag Company, Newton, Iowa, a corporation of Delaware Application March 13, 1943, Serial No. 479,076

2 Claims. (Cl. 121—38)

The present invention relates to an actuating strut mechanism for raising and lowering one of the main wheels of an airplane, and more particularly to an hydraulic transfer tube for transferring and supplying hydraulic fluid from one end to the opposite end of the cylinder and actuating the movable piston rod to retract and elevate this wheel.

The invention further comprehends a novel means and method of assemblying the hydraulic tubing without the use of the usual multiplicity of parts including fittings, connections, etc. In the present novel construction, each end of the tubing is inserted into an opening and by reason of the sealing and holding means employed and each end of the tubing retained in a similar opening, the hydraulic pressure which would tend to force the tube ends out of their openings is balanced and these ends are securely retained against accidental or unintentional removal.

A further advantage of the present construction is the novel retaining and sealing means for the ends of the tubing by which vibration or relative movement of the tubing with respect to its mounting will not effect the seal.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

Figure 1:
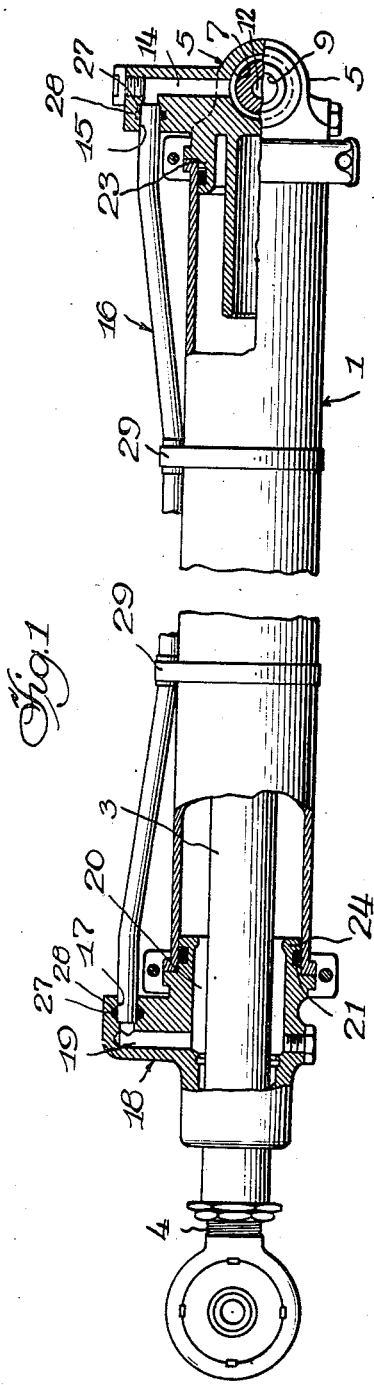
Figure 1 is a fragmentary view, part in side elevation and part in vertical cross section, showing the manner of mounting the transfer tube on actuating strut assembly which raises and lowers one of the main wheels of an airplane.
Figure 2:
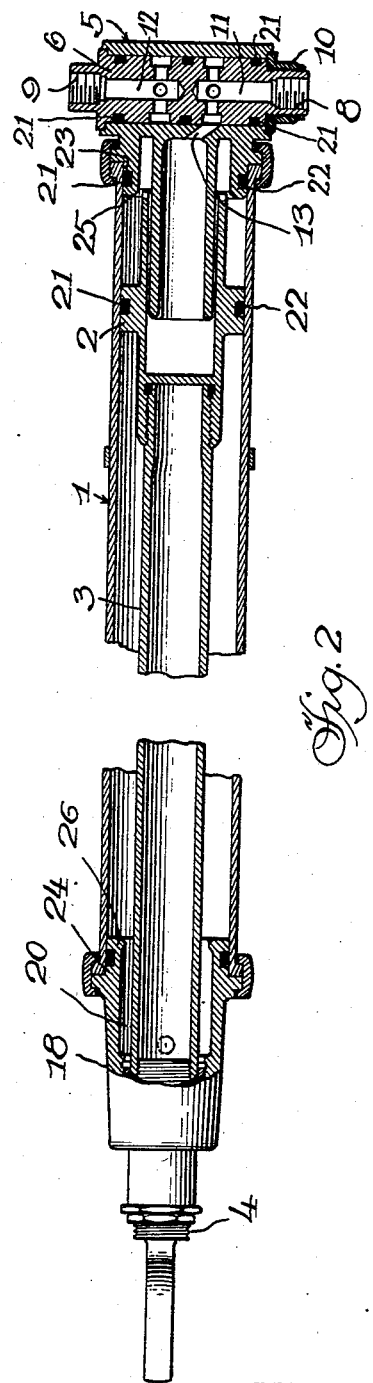
Figure 2 is a fragmentary view, part in plan and part in horizontal cross section, of the assembly shown in Figure 1.

Referring more particularly to the disclosure in the drawing, the actuating strut assembly comprises a cylinder 1 having a piston 2 and piston rod 3 to the outer end of which is connected an end fitting 4 carrying suitable linkage mechanism upon which the main wheel is mounted (not disclosed). The cylinder 1 is provided with a head 5 adapted to swivel or pivot about a pivot pin 6 mounted within the opening 7 in the head. This pivot pin is provided at its opposite ends with threaded connections 8 and 9 and is retained within the cylindrical opening 7 by a pivot nut 10. These connections are each provided with suitable passages 11 and 12, respectively, for the hydraulic fluid from a suitable source of fluid supply. Hydraulic pressure is applied alternately from one side of the pivot pin 6 to the other. When hydraulic pressure is applied to the connection 8 and the oil enters through the passage 11 and passes into the cylinder 1 through the opening 13 in the head, it forces the piston 2 and piston rod 3 outward and actuates the strut mechanism to lower the wheel.

When the pressure is applied to the connection 9 of the pivot pin, the oil or hydraulic fluid entering the passage 14 is by-passed through the opening 15 in the head and is forced through the tubing 16 into the opening 17 in the housing 18 at the end of the cylinder opposite that of the head 5. From this opening the hydraulic fluid enters the passage 19 and passes through the annular space 20 between the piston rod 3 and cylinder 1 to force the piston 2 and piston rod inwardly and thereby elevating or retracting the actuating strut and wheel.

Sealing means such as a sealing ring 21 positioned within a recess or groove 22, are provided to prevent leakage between the cylinder 1 and piston 2, between the cylinder head 5 and the pivot pin 6, and between the external surface 23 and 24 of the reduced flanged ends 25 and 26 of the head 5 and housing 18, respectively, and the cylinder 1 to prevent leakage between these associated parts.

In order to assemble the tubing 16 within the opening 15 in a face of the head 5 and in the opening 17 in a face of the housing 18, the invention comprehends providing in each of the openings 15 and 17 an inwardly opening annular channel 27 in which is mounted a resilient sealing ring 28 of substantially circular cross section, the cross sectional area or diameter of the sealing ring being less than the width but greater than the depth of the channel, so that when the opposite ends of the tubing 16 are inserted into these openings, these sealing rings will tightly grip adjacent the ends of the tubing and retain the tubing in fixed position. Furthermore, these rings 28 will seal against leakage between the tubing and its mounting in the head 5 and housing 18.

This construction eliminates the use of a multiplicity of parts and connections such as the fittings and couplings now employed, and inasmuch as both ends of the tubing are slipped into similar openings, the hydraulic pressure which would normally tend to push the tubing out of the openings is balanced.

In order to prevent possible bending and subsequent failure of the tubing which may be of metal or other material suitable for the purpose, it is preferably anchored intermediate its ends by means of spaced clamping rings 29. Where these clamping rings encompass the tubing and anchor it to the cylinder, the tubing is preferably wrapped with suitable material such as friction tape coated with shellac.

Having thus disclosed the invention, I claim:

1. In a hydraulic cylinder construction comprising a cylinder body, a head at the opposite ends thereof, and a transfer tube adapted to carry fluid from one head to the other, openings in the heads for receiving the opposite ends of the tube, circumferential grooves located in said openings, resilient sealing rings carried in said grooves and sealing the ends of the transfer tube against leakage, a cylindrical part on the end of each head of substantially the same diameter as the bore of the cylinder body for aligning said heads, circumferential grooves located in said cylindrical parts, resilient sealing rings disposed in said grooves for sealing contact with the interior of the cylinder and sealing the heads against leakage, and clamping means on the opposite ends of the cylinder for retaining the cylinder, heads and transfer tube in rigid assembly, said sealing rings associated with the ends of the transfer tube and the cylinder being independent of the pressure of said clamping means.

2. In a hydraulic cylinder construction comprising a cylinder body, a head at the opposite ends thereof, and a transfer tube adapted to carry fluid from one head to the other, openings in the heads for receiving the opposite ends of the tube, cylindrical parts on the heads for insertion into said cylinder body for aligning and guiding the heads in the cylinder body, clamping means on the opposite ends of the cylinder, the entire construction including the transfer tube, the cylinder body and both heads being held in rigid and aligned assembly solely by the clamping means, circumferential grooves disposed in the openings and on the cylindrical parts of the heads, resilient sealing rings carried in said grooves for effecting a seal between each end of the transfer tube and the heads and between each end of the cylinder body and the heads, said sealing means being effective upon location in assembly and independent of the clamping pressure of said clamping means.

THOMAS R. SMITH.